Figure 1:
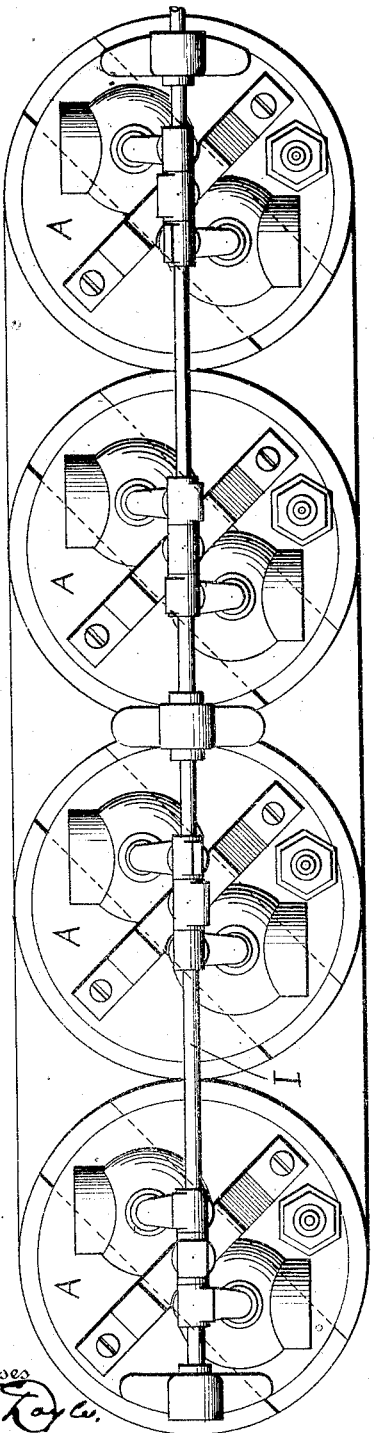

H. B. KEIPER.
INTERNAL COMBUSTION ENGINE.
APPLICATION FILED SEPT. 7, 1915.

1,171,211.

Patented Feb. 8, 1916.
2 SHEETS—SHEET 1.

H. B. KEIPER.
INTERNAL COMBUSTION ENGINE.
APPLICATION FILED SEPT. 7, 1915.
1,171,211.
Patented Feb. 8, 1916.
2 SHEETS—SHEET 2.
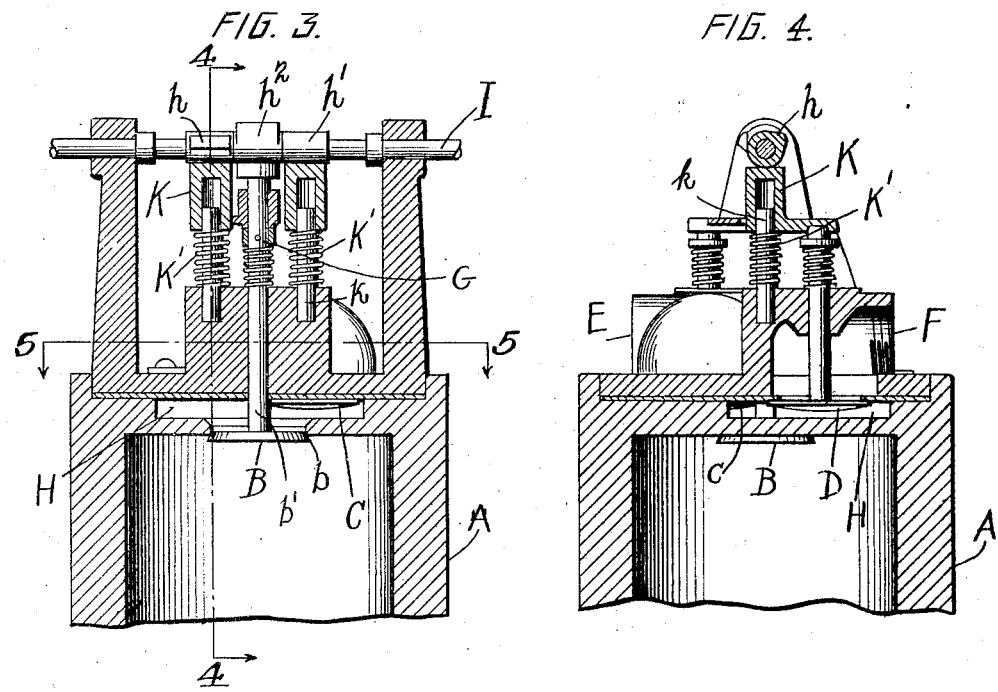
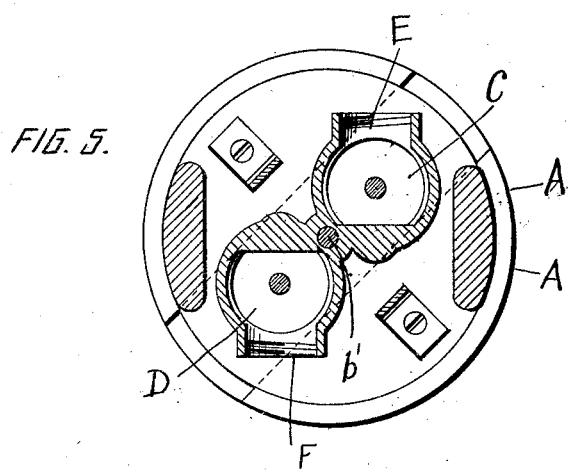

UNITED STATES PATENT OFFICE.

HENRY B. KEIPER, OF LANCASTER, PENNSYLVANIA.

INTERNAL-COMBUSTION ENGINE.

1,171,211.  Specification of Letters Patent.  Patented Feb. 8, 1916.

Application filed September 7, 1915. Serial No. 49,196.

*To all whom it may concern:*

Be it known that I, HENRY B. KEIPER, a citizen of the United States, residing at Lancaster, in the county of Lancaster and State of Pennsylvania, have invented certain new and useful Improvements in Internal-Combustion Engines; and I hereby declare that the following is a full, clear, and exact description thereof, reference being had to the accompanying drawings, which form part of this specification.

This invention relates to internal combustion engines, and more particularly to that type of engine in which a single main valve in the cylinder head or end is used to control the admission and exhaust to the cylinder or explosion chamber at one end of the cylinder, together with auxiliary valves controlling the intake and exhaust through said main valve.

In engines of the character referred to as heretofore constructed, the auxiliary intake valve is opened and the introduction of the explosive mixture effected by suction, due to the backward stroke of the piston in the engine cylinder, but opposed by spring-pressure tending to close the valve and similarly the auxiliary exhaust valve is opened by the pressure of the compressed gases immediately following an explosion in the combustion chamber, as a result of which the exhaust port closes before a certain residue of the unused gases is permitted to escape, owing to the equalization of pressure when the pressure on the inside of the exhaust valve is reduced, so that the pressure on the inside of the valve is about equal to the atmospheric pressure on the outside of the valve, and on the opening of the intake valve the unused gases trapped by the closing of the exhaust port are drawn back into the combustion chamber in admixture with the incoming charge of explosive material, thereby reducing the effective power of the explosion and materially affecting the working force of the engine, rendering such engines unsatisfactory, inefficient, wasteful, and commercially impracticable.

The principal objects of my invention are to provide an internal combustion engine which will not be subject to the objections above noted, and in the operation of which the complete elimination or expulsion of the unused gases and waste products of combustion will be effected at each discharge interval, while the introduction of a fresh charge will be effected without the admixture of unused gases resulting from the explosion of a previous charge, and also to improve generally the efficiency and operation of such engines, thereby greatly increasing the effective power or working force of the engine and very materially reducing the quantity of explosive mixture required to operate engines of this type as heretofore constructed.

A further object is to provide means whereby a number of engines may be nested or grouped in compact form, so as to occupy very little space as compared with the space occupied by a corresponding number of engines as heretofore arranged.

To these ends I provide means whereby the single main valve controlling the admission and exhaust to the engine cylinder, and also the auxiliary valves controlling the admission and exhaust through said single valve, are each positively actuated in opening and are held open for the desired interval of time to permit the introduction of an explosive mixture, or the complete exhaust or expulsion of the waste products of combustion before the exhaust valve closes; the valve-operating mechanism being so timed that the exhaust from the engine cylinder is opened immediately following the opening of the auxiliary exhaust valve and kept open in such manner that the entire output of unused gases or waste products of combustion will be expelled on the return stroke of the piston, whereupon the auxiliary exhaust port will be closed, and the auxiliary intake valve opened, the main or compression valve remaining open meanwhile, for the admission of a new charge, after which the main valve and the auxiliary intake valve are closed until the explosion occurs, whereupon the exhaust valves will be again opened and so on as the operation is continued.

The invention will first be hereinafter more particularly described, with reference to the accompanying drawings forming a part of this specification, and then pointed out in the claims at the end of the description.

Figure 2:
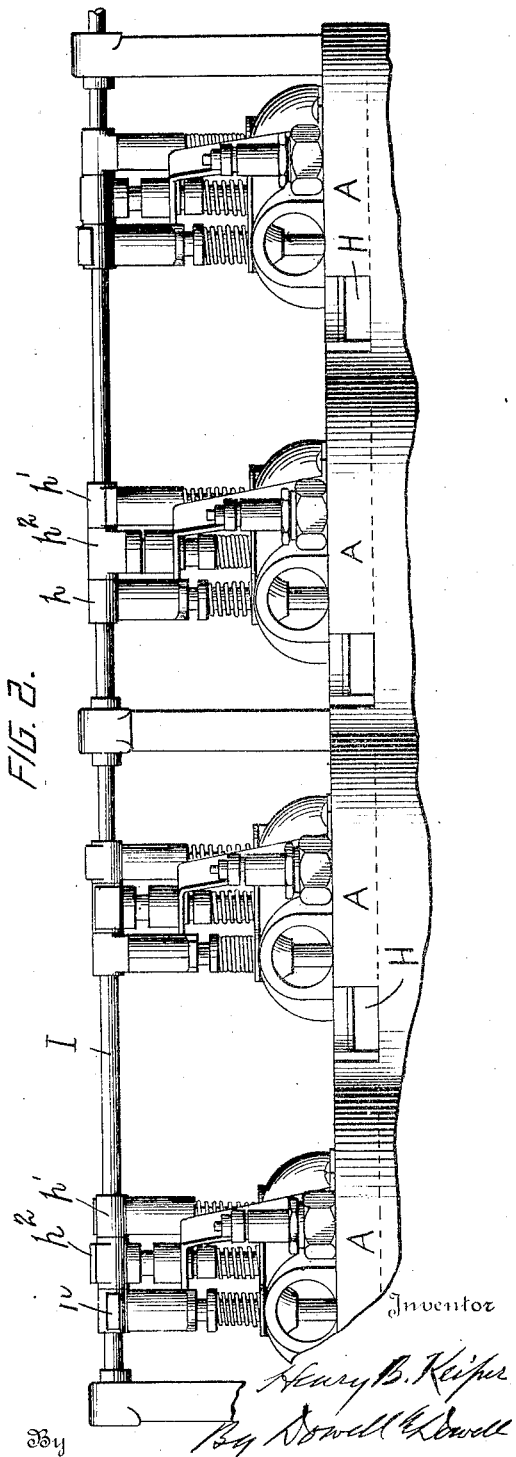

In said drawings, Figure 1 represents a plan view of an internal combustion engine embodying my invention; Fig. 2 is a side elevation of the upper portion of the same; the lower portion of the engine cylinders and other parts being broken away; Fig. 3 is a detail vertical sectional elevation through the upper end of one of the engine cylinders and its valve-operating mechanism; Fig. 4 is a detail vertical sectional view taken on the line 4—4 of Fig. 3, looking in the direction of the arrows; and Fig. 5 is a detail transverse section taken on the line 5—5 of Fig. 3, looking downwardly as indicated by the arrows.

Referring to said drawings, in which the same reference letters are used to denote corresponding parts in different views, the letters A, A, denote a series of cylinders arranged in a row close together and each having a main valve B, controlling the admission of the explosive mixture and the exhaust, said main valve being arranged in alinement with the main valves of the entire group, while the auxiliary valves C, which control the admission of the explosive mixture through the main valve, and the auxiliary valves D, which control the exhaust through said main valve, are arranged one upon one side and the other upon the opposite side of the main valve; such arrangement being accomplished by setting the cylinders askew, or turning them part way around, so that all of the intake valves are on one side of the valve-operating cam shaft, and all of the exhaust valves on the other side of said shaft, thus nesting the valves so as to bring them and their operating mechanism close together and adapt the same to occupy much less space than is usually required in engines of this character as heretofore constructed. In each of said cylinders is placed a reciprocating piston (not shown), which may be actuated by the main crank shaft of the engine in the usual or any preferred manner.

The several cylinders A, A and their main and auxiliary valves and valve-operating mechanism are substantially duplicates one of the other, so that a description of one will be a sufficient description of the entire group. In each cylinder-head or end a single opening is provided for the admission of gasolene or other explosive mixture into the explosion chamber within the upper end of the cylinder to be compressed by the piston, and said opening is controlled by said main valve B, which opens downwardly and is preferably of disk form having a beveled edge $b$ fitting a correspondingly beveled seat around the opening therefor in the upper end or head of the cylinder. The valve B, preferably a puppet valve, may have its stem $b^1$ extended up through a suitable stuffing box in or on a valve case mounted on the upper end of the cylinder or cylinder-head; said case being provided at one side with a conduit E, for the admission of the explosive mixture through the auxiliary intake valve C, and at the other side with an exhaust conduit F, controlled by the auxiliary exhaust valve D, through which the unused gases and waste products of combustion are discharged and find their way out through the usual muffler, when used as gasolene engines are commonly used in the construction of automobiles. The valves C and D are also preferably puppet valves of the same type as the main valve B, each having a stem which is slidably fitted in a suitable stuffing box in or on the valve casing.

The several valves are each preferably held normally closed by means of a coiled or other suitable spring, such as is commonly employed in gas engines. In the present instance, a coiled spring surrounds each valve stem between a collar thereon and a fixed part of the casing, and tends normally to force the valve to its seat. Said collar may be integral with the valve stem, or it may be adjustably secured thereon, an adjustable collar being shown on the stem of the main valve and denoted by the letter G, Fig. 3.

The main valve B is separated from the intake and exhaust valves C and D by a narrow space or chamber H extending obliquely across the cylinder-head and in direct communication with the intake and exhaust valves above the main valve, and also in direct communication with said main valve below the intake and exhaust valves, and the auxiliary intake and exhaust valves open downwardly into said space while the main valve opens downwardly therefrom into the explosion chamber within the cylinder, so that the explosive mixture passes through said narrow space directly into the explosion chamber while the unused gases and waste products of combustion pass out directly into and through said space into the exhaust conduit. The gasolene or explosive mixture being thus introduced through the single valve in the cylinder-head, said valve and its seat are thoroughly washed and cleaned by the inflowing gasolene or other explosive mixture as each charge is introduced, and the valve and valve seat are thereby kept clean, thus insuring a perfectly tight fit of the main valve, and in the event of any leakage through the auxiliary valve, which is liable to occur in gas engines as ordinarily constructed, with both the intake and exhaust valves necessarily of small size, the operation of the engine will not be affected or the power produced by the explosion reduced, and the described arrangement of valves separated by said narrow space between the intake and exhaust ports and the main valve also facilitates the escape of any residue of unused gases or the waste products of combustion which are liable to be trapped in the explosion chamber by the closing of the exhaust valve. Further-more, by the described arrangement the main valve may be of any desired construction such as may be found most desirable in practical use, its size being limited only by the diameter of the cylinder-head, and if desired it may be approximately of the same diameter as the cylinder-head, although such size is not necessary, as it is desirable to make the valve-opening just large enough for the purpose and to adapt the valve lid to be raised by only a slight movement of the actuating cam. In engines of this character as heretofore constructed it is usually necessary to raise the valve lid from 1/4″ to 3/8″, whereas in my improvement it is not necessary to raise the valve more than from 1/8″ to 3/16″, this advantage being gained in the diameter or size of the valve lid that may be employed. The letter I denotes a shaft extending horizontally across the series of cylinders and adapted to be driven in any suitable manner from the main crank shaft of the engine; for instance, by means of a belt or vertical shaft geared to the main crank shaft of the engine in a manner well known in this class of machines, so that no further description or illustration thereof is deemed necessary. Said shaft I may be journaled in standards rising from the cylinder-heads or valve casings, as shown, and is provided with a series of cams for actuating the series of valves, each in its order; the corresponding valves of each cylinder being actuated simultaneously by the rotation of the shaft. As shown, a cam $h$ on the shaft I over each cylinder actuates the exhaust valve at one side of the cam shaft, while a cam $h^1$ actuates the intake valve on the opposite side thereof, and a cam $h^2$, arranged between the cams $h$ and $h^1$, actuates the main valve. The stems of the valves C and D being out of alinement with the stems of the valves B, vertically movable tappets K are interposed between the cam shaft and the upper end of each valve stem, which tappets, in the form shown, consist of a head piece having a socket in which is fitted a post $k$ rising from the cylinder-head or valve casing thereon, on which may be placed a coiled or other suitable spring $k^1$, which tends to normally raise the tappet and hold the head portion thereof in contact with the actuating cam on the cam shaft; said tappet having a lateral arm which overlies and may be recessed to receive the upper end of the stem of the valve C or D, so that when said tappet is depressed by the actuating cam the valve will be opened, and as the cam releases the tappet the spring on the valve stem will instantly close the valve.

It will be understood, of course, that other means may be employed for actuating the valves; the valve-operating mechanism being so timed as to operate the valves in regular order at the proper interval of time for the admission of the explosive mixture and to permit the escape of the unused gases and waste products of combustion after an explosion occurs.

In operation, assuming that the inlet and exhaust ports are closed and also the main valve, as shown at the left hand end of Fig. 2 of the drawings, while the piston is making a full upward stroke, the explosive mixture under compression within the explosion chamber may be ignited at the proper interval of time by any suitable means, for instance, by means of an electric spark produced by an electrically operated device, such as in common use in this class of machines, thus producing an explosion, which will force the piston backward, turning the main crank-shaft, and on the return stroke of the piston the auxiliary exhaust valve will be thrown open by its positive actuating cam and practically simultaneously therewith the main valve will be positively opened to permit the complete expulsion of the unused gases and waste products of combustion, whereupon, as the rotation of the cam shaft is continued, the auxiliary exhaust valve will be closed and the auxiliary intake valve will be thrown open by its positive actuating cam, the main valve meanwhile remaining open, so that a new charge may be drawn into the explosion chamber as the piston descends, and thereupon, as the piston again starts upward, both the main valve and the auxiliary intake valve will be closed, practically simultaneously, and the explosive mixture compressed by the upwardly moving piston and exploded at the proper time, whereupon the expulsion of the unused gases and waste products of combustion will again take place, and another charge will be introduced, and so on, as in the operation of the ordinary internal combustion engines heretofore employed in operating automobiles and for other purposes.

In my improvement all of the valves being positively actuated in opening, they cannot close against the positively applied force, and there is no pressure to be overcome in expelling unused gases and waste products of combustion and no danger of an equalization of pressures or reduction of pressure of the force exerted in opening with consequent increase of opposing pressure that will prevent complete expulsion of the waste products of combustion, while on the intake movement the entire force or power of the suction or vacuum created by the downward movement of the piston is exerted in drawing in a new charge, unimpeded as in prior constructions by opposing spring or other pressure counteracting or resisting the force of the suction and tending initially to close the intake valve, the closure of which is effected as the force of the suction is decreased. Moreover, in my improvement the main valve controlling the inlet and exhaust to the cylinder is separated from the intake and exhaust ports controlled by the auxiliary valves by a very narrow space, bringing the three valves close together, and both the intake and exhaust valves are adapted to open into said space, while all of the valves are movable in the same direction, and the inflowing mixture serves to clean the intake valve or valves so as to insure a perfect closure or seating of the valves, thus avoiding the liability to leakage or escape of the explosive fluid.

Having thus described my invention, what I claim as new and desire to secure by Letters Patent is:

1. In an internal combustion engine, a cylinder having at one end an explosion chamber and a single valve controlling both the inlet and exhaust to said chamber, intake and exhaust ports in close proximity to said valve but slightly separated therefrom by a narrow space, auxiliary normally closed valves each controlling one of said ports and each adapted to open into said space, and means whereby each of said valves in opening is positively actuated.

2. The combination, in an internal combustion engine, of a cylinder having a reciprocating piston therein, a single valve at one end adapted to control the intake and exhaust from said cylinder, and intake and exhaust ports in close proximity to but separated from said single valve by a narrow space, together with auxiliary valves controlling said ports, each adapted to open into said space and movable in the same direction as said single valve, together with positively actuated mechanism for opening said valves.

3. An internal combustion engine comprising a cylinder, a reciprocating piston, a single normally closed valve controlling the inlet and exhaust from said cylinder, a valve case mounted on the cylinder-head so as to leave a narrow space above said valve of substantially uniform depth from side to side of the cylinder-head; said case having inlet and exhaust ports therein, one in communication with a source of explosive fluid supply and the other in communication with the exhaust conduit, and auxiliary normally closed valves each controlling one of said ports; the first mentioned valve being adapted to open downwardly into the explosion chamber and the auxiliary valves arranged to open downwardly into said narrow space, all movable in the same direction, and means for positively actuating said valves to open them.

4. In an internal combustion engine, an inwardly opening normally closed puppet valve controlling the inlet and exhaust from the engine cylinder, inlet and exhaust ports located in close proximity to said valve but separated therefrom by a narrow space over the cylinder-head, and puppet valves controlling said ports each opening into said space and movable in opening in the same direction as said first mentioned valve, together with means whereby each of said valves in opening is positively actuated.

5. In an explosive engine, a cylinder having a single valve controlling the inlet and exhaust thereto, auxiliary valves controlling the inlet and exhaust through said single valve; the latter valve being separated from said intake and exhaust valves by a narrow space, and said intake and exhaust valves opening into said space; all of said valves being movable in the same direction; said intake valve being arranged at one side of said main valve, and said exhaust valve arranged at the opposite side thereof and a shaft having a series of cams thereon whereby the several valves are positively actuated in opening by the same shaft each in the proper interval of time to control the admission and exhaust to said cylinder through said narrow space.

6. In combination with the engine cylinder having a single valve controlling the admission of the explosive mixture and the exhaust thereto, of a valve casing mounted on said cylinder at one end so as to provide a narrow space above said single valve, intake and exhaust valves arranged to open into said space, each movable in the same direction as said main valve, and means for actuating said valves consisting of a shaft having a series of cams thereon each adapted to positively open one of said valves at the proper interval of time, together with means for automatically closing each valve when released by its actuating cam.

7. In an internal combustion engine, a vertically disposed cylinder having a single valve at its upper end controlling the admission and exhaust thereto, a valve casing mounted on said end but separated from said valve by a narrow space which communicates with an inlet for the explosive mixture and with an exhaust conduit, and auxiliary valves controlling the intake and exhaust through and arranged to open into said space, together with means for actuating said valves to positively open the same at the proper interval of time to effect the admission of the explosive mixture and the exhaust after an explosion occurs.

8. In combination with an engine cylinder having a single opening through one end, a puppet valve controlling said opening, a valve casing mounted on said end so as to provide a narrow space above said valve, a puppet valve opening into said space and controlling the inlet thereto, a puppet valve also opening into said space and controlling the exhaust therefrom, and means for positively opening said valves each at the proper interval of time to effect the infeed and exhaust through said single valve and space.

9. In combination with the engine cylinder and a single valve controlling the admission and exhaust thereto, auxiliary intake and exhaust valves controlling the inlet and exhaust through said main valve, and a shaft having a series of cams thereon each adapted to positively open one of said valves at the proper interval of time; said intake and exhaust valves being arranged on opposite sides of said shaft and having valve stems arranged out of alinement therewith, and means interposed between the cams on said shaft and the stems of said intake and exhaust valves, whereby the latter and the main valve are actuated by alined cams on the same shaft.

10. In combination, a series of vertically disposed cylinders each having a valve seated in its upper end for controlling the admission and exhaust thereto; said cylinders being arranged askew and closely nested together, each cylinder having its intake and exhaust through said main valve controlled by an auxiliary valve adjacent to said main valve but separated therefrom by a narrow space; the auxiliary intake valve being arranged at one side and the auxiliary exhaust valve at the other side of said main valve, and a shaft extending longitudinally of the group of cylinders having a series of cams thereon each adapted to actuate and positively open one of said valves at the proper interval of time; said cams being out of alinement with the stems of the intake and exhaust valves, and vertically movable tappets interposed between said intake and exhaust valves and the actuating cams on said shaft and provided with lateral arms engaging the stems of said intake and exhaust valves for actuating the same.

In testimony that I claim the foregoing as my own, I affix my signature in presence of two witnesses.

HENRY B. KEIPER.

Witnesses:
   CHAS. E. LONG,
   JAMES PRANGLEY, Jr.